No. 853,024. PATENTED MAY 7, 1907.
H. C. MUSTIN & G. N. SAEGMULLER.
SIGHT FOR ORDNANCE.
APPLICATION FILED APR. 17, 1906.
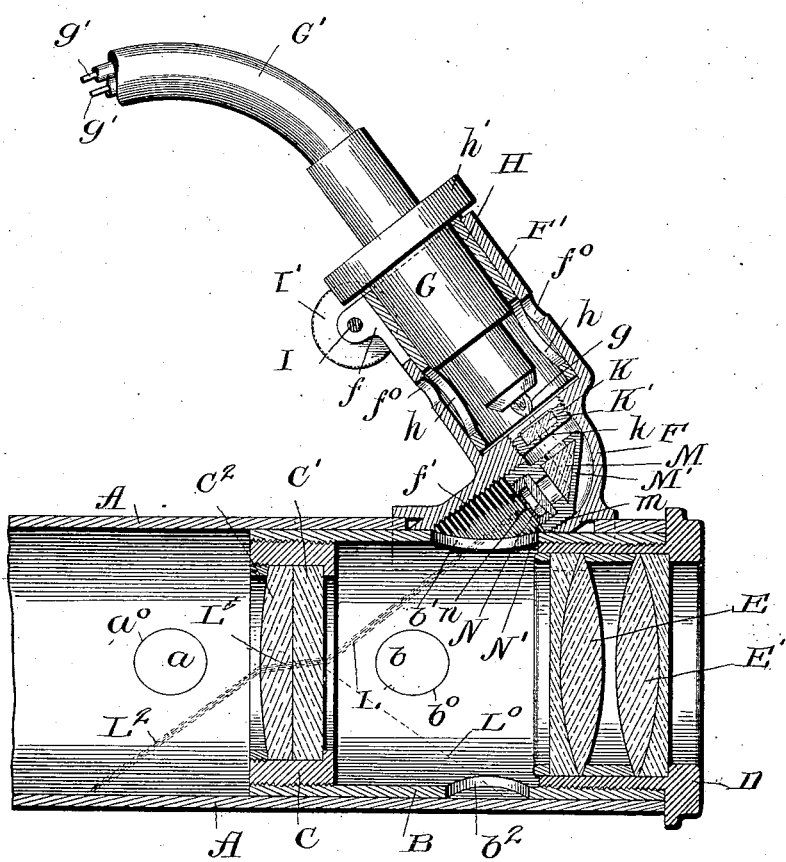

UNITED STATES PATENT OFFICE.

HENRY C. MUSTIN, OF WASHINGTON, DISTRICT OF COLUMBIA, AND GEORGE N. SAEGMULLER, OF ROCHESTER, NEW YORK; SAID MUSTIN ASSIGNOR TO SAID SAEGMULLER.

SIGHT FOR ORDNANCE.

No. 853,024.     Specification of Letters Patent.     Patented May 7, 1907.

Application filed April 17, 1906. Serial No. 312,212.

*To all whom it may concern:*

Be it known that we, HENRY C. MUSTIN, residing at Washington, in the District of Columbia, and GEORGE N. SAEGMULLER, residing at Rochester, in the county of Monroe and State of New York, both citizens of the United States, have invented certain new and useful Improvements in Sights for Ordnance; and we do hereby declare the following to be a full, clear, and exact description of the invention, such as will enable others skilled in the art to which it appertains to make and use the same.

This invention consists in an illuminating attachment intended to be used at night with gun sight telescopes of that class which have reticules composed of glass or other refracting material with cross lines etched therein.

The purpose of the invention is to illuminate a portion of the cross lines drawn or etched on the surface of glass in a compound cemented lens of a sight telescope.

The object of the invention can be explained by pointing out the defects in other devices for illumination. For example, there is one which consists in placing in the eye piece of a telescope a glass reticule with parallel plane faces; on one of these faces cross lines are etched. The periphery of the reticule is polished and silvered except for a small portion where a pencil of light is admitted to the interior; the rays of light entering the interior illuminate a portion of the cross lines directly and illuminate the other portions indirectly after successive reflections at the cylindrical mirror formed by the periphery of the reticule. The complete cross lines are thus rendered visible; but besides the light scattered from the cross lines there is light from the caustics which are necessarily formed within the field, by reflection at the cylindrical surface of the periphery of the reticule; also there is light scattered from dust, or any inequalities on the faces of the reticule. All of this light is additional to the light emitted by the target or other object under observation; now it is well known that when an observer is looking at a dim object, all luminous surfaces between the object under observation and his eye are serious hindrances to his ability to see the object. But, in order that the line of sight may be directed to the target, the observer must be able to see the intersection of the cross lines, so there must be at least a sufficient amount of light for that purpose interposed between his eye and the target. In the case cited, there is added to this amount, a comparatively large quantity which is certain to be given by the caustics. The same defect appears in another type of illuminating device in which, instead of a reticule, there is a compound cemented lens, on one of whose cemented faces are etched the cross lines. The periphery of this compound lens is polished and silvered except for a small portion where the pencil of light is admitted to illuminate the cross lines; the caustics by reflection at a cylindrical surface are therefore formed within the field of this telescope also, and thus the observer's ability to direct the line of sight to a dim target is seriously hindered. It is evident that the efficiency of a night sight telescope will be a maximum when the intensity of light from luminous surfaces interposed between the eye and the object under observation is reduced to a minimum. To this end it is necessary to remove the caustics and to restrict the illuminated area of the lines to only that portion of them that is required for directing the line of sight. Now in order that the line of sight may be directed, it is necessary, as stated above, for the observer to distinguish the intersection of the cross lines; the vicinity of the intersection must therefore be given a certain intensity of illumination per unit of area. Heretofore it has been the practice to give the cross lines or, in other types, to the cross wires or hairs a uniform illumination over all parts of them that appear in the field. Now if the illumination per unit of area is kept constant, and the area illuminated be restricted to the vicinity of the intersection, the ability of the observer to direct the line of sight will not be interfered with, but the total quantity of light sent from the lines to the observer's eye will be diminished.

The object of our invention, therefore, is to illuminate a very small portion of the intersection of cross lines, without producing in the field of the telescopes any caustics or luminous areas that would be a hindrance to the ability of an observer to distinguish a dim target or other object; the area illuminated in the vicinity of the intersection of the lines or wires is made so small that, although the intersection is distinct, the hindrance from this interposed luminous area is negligible. We will now describe our means of accomplishing this in the case of a sight telescope in which there are etched cross lines on one of the cemented faces of a compound field lens.

A small pencil of approximately parallel rays of light from the rear, is thrown on the rear face of the field lens at such an angle that the axis of the pencil, after refraction at this face, makes as small an angle with the axis of the eye piece as is practicable. The direction of the pencil, inside the field lens, is such that its path crosses and thus illuminates the intersection of the cross lines. The pencil after emergence from the front face of the field lens proceeds to a portion of the telescope tube that is obscured from the eye of the observer. There is of course a partial reflection at the rear face of the field lens where the pencil enters; but these partially reflected rays proceed to a recess in the tube which is obscured from the eye of the observer. The partial reflection at the front face of the field lens when the pencil emerges, is negligible for the incident light is very nearly normal to the surface at this point. In consequence of this arrangement only a small amount of light is thrown on the intersecting lines, and this light is sufficient only for the purpose of illuminating the vicinity of the intersection of those lines, and it does not subsequently appreciably affect the clearness of the object.

This invention will be understood by reference to the accompanying drawing, which represents a central vertical section through the eye piece end of a sight telescope and shows the illuminating attachment partly in section and partly in elevation.

In the drawing the eye piece end of the telescope only is shown, as the other parts of the telescope are well known in the art and do not constitute a part of this invention.

A represents the main telescope tube in which is mounted the sleeve B, which carries the compound field lens which is composed of the plane glass plate C′ cemented to the lens C². Etched on the face of this plate C′ or on the face of the lens C², where the two faces abut, are the ordinary intersecting lines, which correspond to cross hairs. These lines are well known and are not shown in the drawings. To keep the outer surface of the plate and lens free from dust, openings a° and b° are provided, which are closed by suitable shutters a and b. These shutters may be removed and the face of the lens or plate may be brushed off with a suitable brush inserted through the opening; thus, whenever necessary, the field lens may be cleaned without disturbing the optical adjustment of the telescope, and thus disturbing the relation between the line of bore of the gun and the line of sight.

The compound lenses E and E′ which compose the eye lens combination are mounted in the ring D, which is screwed into the sleeve B.

So far as described, the optical parts are all old, and the invention consists in applying to these old parts the improved illuminating device which will now be described.

F represents a socket piece, which is attached to the telescope tube A over the opening b′ in the sleeve B. This socket piece projects upward as at F′ to form a holder for the socket H of the insulating piece G, which carries a small incandescent lamp g. This holder F′ is provided with lugs f to engage the clamp screw I, which is operated by the milled head I′, and thus the socket H is clamped in its holder. Suitable ventilating holes h and f° are provided to prevent excessive heating, while the current is on the lamp. The lamp socket may be moved in or out and clamped at the desired position in the holder F′, whereby the amount of light thrown on the sight may be varied, as desired. In order to control and regulate this light we provide a ground glass plate K secured in an opaque diaphragm K′, which is screwed into the socket piece F. This diaphragm has a small perforation k, which permits the light to pass through to the rectangular prism M, which is mounted in the holder M′, provided with screw threads m engaging in the screw threads f″ in the socket piece. This holder M′ also carries a lens N mounted above the opaque diaphragm N′, which is perforated at n. By this arrangement, a portion of the light from the lamp g illuminates the ground glass plate K; since the plate is translucent and not transparent, the portion of it uncovered by the perforation k acts as a source of light; the intensity of illumination of this source will depend on the nearness of the lamp g; therefore by moving the lamp socket outward the intensity of illumination may be decreased. It will be seen that the source of light, the portion of the ground glass uncovered by the perforation k, remains always in a fixed position with reference to the whole optical system, irrespective of varying positions of the lamp. Divergent pencils of light proceeding from this ground glass source are totally reflected by the prism M and enter the convergent lens N. The ground glass source is positioned in the principal focal plane of the lens N so that the pencils of light after passing through the lens N are changed from divergent to parallel. The small perforation n in the opaque diaphragm N′ limits the diameter of the pencil of light I that enters the telescope tube. This pencil is composed of rays approximately parallel, which proceed to the rear face of the compound field lens; here there is direction by refraction so that they are bent closer to the axis of the eye piece; thus the pencil L' crosses the plane of the cross lines near the axis of the eye piece and illuminates the vicinity of the intersection of the lines. The rays then are refracted by the front face of the field lens and the pencil $L^2$ proceeds toward a portion of the tube that is obscured from the eye of the observer. This portion of the tube is lined with a dull black material, which prevents further reflection. A small part of the pencil L is reflected in the direction L°, and strikes in the recess $b^2$, out of the range of vision. Thus a small part only of the field-lens is illuminated, and by confining this part to the intersection of the cross hairs or lines, as already described, the illumination is so small as not to materially impair the ability of the observer to observe faint objects.

The advantage in using a ground glass source of light lies in the fact mentioned above, that the illuminating pencil always enters the telescope in the same direction, no matter what may be the position of the lamp. This obviates the difficulty of placing the lamp in a certain position with reference to the system. If the lamp alone should be used as a source of light, its filament must have a certain fixed position with reference to the system in order that the pencil will pass over the intersection of the lines. Any variation of the proper position of the lamp in such a case would move the pencil away from the intersection of the lines and said intersection would then become invisible. As these small lamps require frequent renewals, absence of the ground glass would entail a delicate adjustment each time a new lamp is put in, and by having the ground glass source of light, this is entirely avoided. Furthermore the ground glass permits the lamp to be moved in or out, irrespective of the position of the filament, and thus permits the brightness of the illumination on the source to be varied at will. It will also be evident that if the lens N were removed the pencil of light entering the tube would, although divergent, be of a small diameter at the point where it illuminates the cross lines. But in this variation of the attachment the portion of the cross lines illuminated would be larger than when the lens N is used as described.

It will be obvious that various other modifications might be made in the herein described apparatus, which could be used without departing from the spirit of our invention.

Having thus described our invention, what we claim is:—

1. In a sight for ordnance, the combination with a reticule, of means for throwing a pencil of approximately parallel rays of light on a limited portion of said reticule and at an angle to the line of sight, said means comprising an incandescent lamp and a fixed ground glass plate independent of the lamp substantially as described.

2. In a sight for ordnance, the combination with a telescope tube containing a reticule, of means carried by said tube for illuminating a limited portion of said reticule, said means comprising an incandescent lamp and a fixed ground glass plate independent of the lamp substantially as described.

3. In a sight for ordnance, the combination with a telescope tube, of a reticule mounted in said tube, and means for throwing a pencil of approximately parallel rays of light on a portion only of said reticule, and at an angle to the line of sight, said means comprising an incandescent lamp and a fixed ground glass plate independent of the lamp substantially as described.

4. In a sight for ordnance, the combination with a telescope tube, of a reticule mounted in said tube, means for illuminating a portion only of said reticule, said means comprising an incandescent lamp, and a fixed translucent plate independent of the lamp and means for varying the intensity of said illumination, substantially as described.

5. In a sight for ordnance, the combination with a telescope tube, of a reticule mounted in said tube, and means for throwing an approximately parallel pencil of light on a portion only of said reticule and at an angle to the line of sight, said means comprising an incandescent lamp and a fixed ground glass plate independent of the lamp substantially as described.

6. In a sight for ordnance, the combination with a telescope tube, of a reticule mounted in said tube, and means for throwing an approximately parallel pencil of light on a portion only of said reticule and at an angle to the line of sight, said means comprising an incandescent lamp, and a fixed translucent plate independent of the lamp with means for varying the intensity of this bundle of rays of light, substantially as described.

7. In a sight for ordnance, the combination with a telescope tube containing a reticule, of a socket piece carried by said tube, an incandescent lamp carried by said socket piece, a ground glass plate in front of said lamp and means for transmitting a limited portion of the rays of said lamp to a limited portion of said reticule, substantially as described.

8. In a sight for ordnance, the combination with a telescope tube containing a reticule, of a socket piece carried by said tube, an incandescent lamp carried by said socket piece, a ground glass plate in front of said lamp and means for transmitting a limited portion of the rays of said lamp to a limited portion of said reticule, and at an angle to the line of sight, substantially as described.

9. In a sight for ordnance, the combination with a telescope tube, of a reticule mounted in said tube, and means for throwing an approximately parallel pencil of light on a portion only of said reticule, comprising an incandescent lamp, a ground glass plate in front of said lamp, a series of diaphragms, a reflector, and a lens, substantially as described.

10. In a sight for ordnance, the combination with a telescope tube, of a reticule mounted in said tube, and means for throwing an approximately parallel pencil of light on a portion only of said reticule, comprising an incandescent light, a ground glass plate in front of said light a series of diaphragms, a reflector, and a lens, with means for varying the intensity of the light thrown on said reticule, substantially as described.

11. In a sight for ordnance, the combination with a telescope tube containing a reticule, of a socket piece carried by said tube, an incandescent lamp carried by said socket piece, and means for transmitting a limited portion of the rays of said lamp to a limited portion of said reticule, comprising a series of perforated diaphragms, a reflecting prism, and a lens, substantially as described.

12. In a sight for ordnance, the combination with a telescope tube containing a reticule, of a socket piece carried by said tube, an incandescent lamp adjustably mounted in said socket piece, and means for transmitting a limited portion of the rays of said lamp to a limited portion of said reticule, and at an angle to the line of sight, comprising a series of perforated diaphragms, a reflecting prism, and a lens, substantially as described.

13. In a sight for ordnance, the combination with a telescope tube, of a reticule mounted in said tube, and means for throwing a bundle of parallel rays of light on a portion only of said reticule, comprising an incandescent lamp, a series of diaphragms, a right angle prism, and a plano-convex lens, substantially as described.

14. In a sight for ordnance, the combination with a telescope tube, of a reticule mounted in said tube, and means for throwing an approximately parallel pencil of light on a portion of said reticule, comprising an incandescent lamp, a series of diaphragms, a reflecting prism, and a plano-convex lens, with means for varying the intensity of the light thrown on said reticule, substantially as described.

In testimony whereof, I affix my signature, in presence of two witnesses.

HENRY C. MUSTIN.

Witnesses:
   R. M. PARKER,
   J. STEPHEN GIUSTA.

In testimony whereof, I affix my signature, in presence of two witnesses.

GEORGE N. SAEGMULLER.

Witnesses:
   GEORGE H. LEFFLER,
   JOHN REMEIN.